United States Patent
Suess et al.

(10) Patent No.: US 11,579,268 B1
(45) Date of Patent: Feb. 14, 2023

(54) BACKGROUND LIGHT RESILIENT FLASH LIDAR

(71) Applicant: Amazon Technologies, Inc., Seattle, WA (US)

(72) Inventors: Ryan J. Suess, Seattle, WA (US); Joseph Andrew Summers, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 422 days.

(21) Appl. No.: 16/834,563

(22) Filed: Mar. 30, 2020

(51) Int. Cl.
| | | |
|---|---|---|
| *G01S 7/4865* | (2020.01) | |
| *G01S 7/48* | (2006.01) | |
| *G01S 7/499* | (2006.01) | |

(52) U.S. Cl.
CPC .......... *G01S 7/4865* (2013.01); *G01S 7/4808* (2013.01); *G01S 7/499* (2013.01)

(58) Field of Classification Search
CPC ....... G01S 7/4865; G01S 7/4808; G01S 7/499
See application file for complete search history.

(56) References Cited

U.S. PATENT DOCUMENTS

| | | | |
|---|---|---|---|
| 3,689,156 A | 9/1972 | Kerpchar | |
| 9,405,171 B2 | 8/2016 | Grasser | |
| 11,073,390 B2* | 7/2021 | Lee | G01S 7/4811 |
| 2014/0341555 A1 | 11/2014 | Grasser | |
| 2018/0267151 A1* | 9/2018 | Hall | G01S 17/10 |

OTHER PUBLICATIONS

Peng Zhang, Xiaoping Du, Jiguang Zhao, Yishuo Song, and Hang Chen, "High resolution flash three-dimensional LIDAR systems based on polarization modulation," Applied Optics, vol. 56, Issue 13, pp. 3889-3894 (2017).
Chenfei Jin, Xiudong Sun,* Yuan Zhao, Yong Zhang, and Liping Liu,"Gain-modulated three-dimensional active imaging with depth-independent depth accuracy," Optics Letters, vol. 34, No. 22, Nov. 15, 2019, 3 pages.
Park et al. "Three-dimensional imaging using fast micromachined electro-absorptive shutter," Journal of Micro/Nanolithography, MEMS, and MOEMS, Apr-Jun. 2013, 12 pages.
U.S. Naval Research Laboratory press release, Free Space Photonics Communiations Office, retrieved Sep. 5, 2018, 3 pages.
U.S. Appl. No. 16/916,445,"Broadening the Measurement Range of Optical Shutter-Gated Light Detection and Ranging (LIDAR)", filed Jun. 30, 2020.

* cited by examiner

*Primary Examiner* — Bryan Bui
(74) *Attorney, Agent, or Firm* — Patterson + Sheridan, LLP

(57) ABSTRACT

LIDAR systems are less accurate in the presence of background light which can saturate the sensors in the LIDAR system. The embodiments herein describe a LIDAR system with a shutter synchronized to a laser source. During a first time period, the laser source is synched with the shutter so that the reflections are received when the shutter is in the process of changing between on and off states, during which time a function of the shutter (e.g., a phase retardation or opacity) monotonically changes so that reflections received at different times have different time-dependent characteristics (e.g., different polarizations). To mitigate the effects of background light, during a second time period, the laser source is synched with the shutter so that the background light is measured (in the absence of the reflections) which can be used to remove the effects of the background light from a range measurement.

20 Claims, 7 Drawing Sheets

700

705 USE MEASUREMENT OBTAINED DURING THE FIRST TIME PERIOD AS THE RANGE MEASUREMENT

710 USE MEASUREMENT OBTAINED DURING THE SECOND TIME PERIOD AS A NORMALIZATION MEASUREMENT

715 USE MEASUREMENT OBTAINED DURING THE SECOND TIME PERIOD OR A THIRD TIME PERIOD AS A BACKGROUND MEASUREMENT

720 REMOVE THE EFFECTS OF THE BACKGROUND LIGHT FROM THE RANGE MEASUREMENT AND NORMALIZATION MEASUREMENT USING THE BACKGROUND MEASUREMENT

725 IDENTIFY THE RANGE BY NORMALIZING THE RANGE MEASUREMENT USING THE NORMALIZATION MEASUREMENT

FIG. 7

BACKGROUND LIGHT RESILIENT FLASH LIDAR

BACKGROUND

The present description relates to light detection and ranging (LIDAR) systems and, more specifically, to a LIDAR system that is resilient to background light.

LIDAR (also referred to as LiDAR and LADAR) is a technique that is often employed to obtain range or depth information about a target and generate three-dimensional (3D) images (or maps) of the target. For example, a LIDAR system typically measures distance to a target by illuminating the target with pulsed laser light and measuring the reflected pulses with a sensor. The reflected pulses are then used to generate 3D images. LIDAR systems are used in a variety of applications in which accurate range information about a target is needed. For example, using the data collected by a LIDAR system, it is possible to perform terrestrial mapping, target detection and recognition, obstacle detection and avoidance, 3D object capture, component inspection, microscopy, etc.

Two conventional techniques that LIDAR systems typically employ to obtain 3D images include a scanning technique and a flash technique. The scanning technique uses one or more detector pixels and a scanner to acquire 3D images. For example, in the scanning technique, multiple laser pulses are sent out from a laser system, and each laser pulse is directed to a different point on the target by a scanner. The time-of-flight (ToF) (of the reflected pulse) is then obtained for each target point, using a single detector pixel. The flash technique, in contrast, uses an array (e.g., two-dimensional (2D)) detector and a single laser pulse to illuminate the entire target and acquire 3D images.

BRIEF DESCRIPTION OF DRAWINGS

Various embodiments in accordance with the present disclosure will be described with reference to the drawings, where like designations denote like elements.

FIG. 7 is a flowchart for removing background light from a range measurement and a normalization measurement, according to one embodiment.

DETAILED DESCRIPTION

LIDAR systems are less accurate when in the presence of background light (e.g., solar light or any other light at the same wavelength as the laser used in the LIDAR system). Often, the background light can saturate the sensors in the LIDAR such that the reflections from the laser cannot be detected. The embodiments herein describe a LIDAR system with a shutter synchronized to a laser source. As a result, the LIDAR system can ensure reflections received from emitting a laser into a scene are received at a time period when the shutter is in a desired state. In one embodiment, the shutter includes a polarization modulator which changes the polarization of the received reflections. During a first time period, the laser source is synched with the shutter so that the reflections are received when the polarization modulator is monotonically changing the incident polarization so that reflections received at different times (e.g., from objects at different distances from the LIDAR system) have different polarizations. Thus, the polarization of the reflections encode distance data.

To remove or mitigate the effects of background light, during a second time period, the laser source is either turned off or synched with the shutter so that the reflections are unchanged when passing through the polarization modulator. Thus, regardless when the reflections are received, they have the same polarization when exiting the modulator. During this second time period, the LIDAR system can identify two measurements: a normalization measurement which can be used to account for the reflectivity of the objects generating the reflections and a background measurement representing the effect of background light on the measurements. The LIDAR system can use the background measurement to remove the effects of the background light from a range measurement obtained during the first time period and the normalization measurement obtained during the second time period. The LIDAR system can also use the normalization measurement to normalize the range measurement and determine a distance (i.e., a range) to the objects generating the reflections. Because the LIDAR system can remove the effects of the background light, the LIDAR system can operate in both low light conditions (e.g., night time or an indoor environment) as well as bright light conditions (e.g., outdoors during a sunny day). Another benefit of the LIDAR system described herein is that it is a pulsed-based method. In one embodiment, the shutter is only open for a short proportion of time compared to the period of the pulse train. The shutter is opening or open only when the LIDAR systems expects the pulses to be returning to the system during the range and normalization measurements, respectively.

Figure 1:
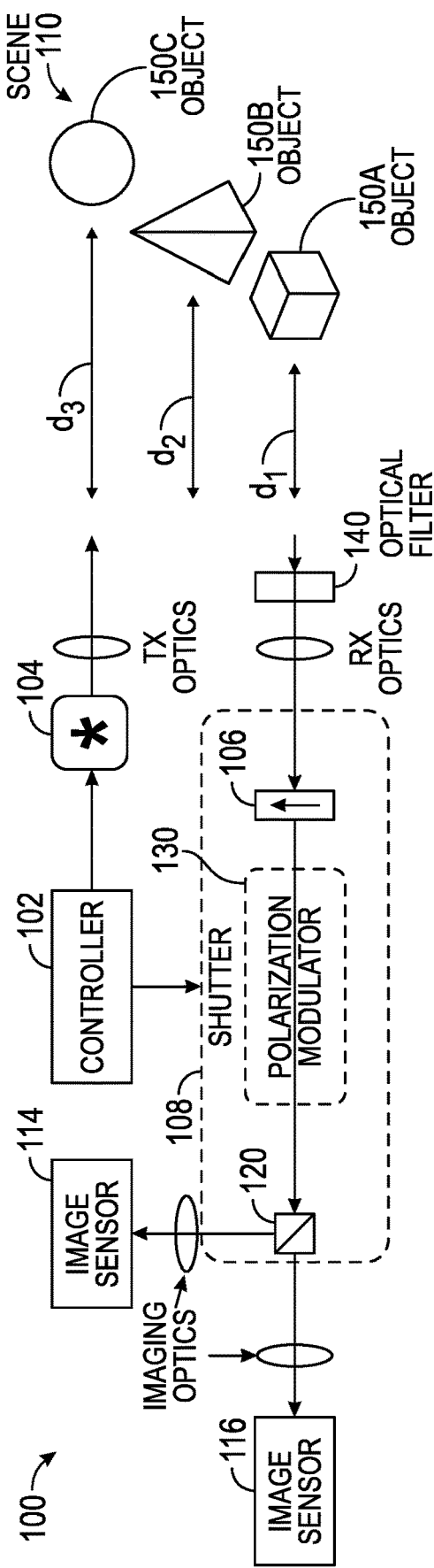
FIG. 1 is a block diagram illustrating a LIDAR system that includes a polarization-modulated receiver, according to one embodiment.

FIG. 1 is a block diagram illustrating a LIDAR system 100, according to one embodiment. In one embodiment, the LIDAR system 100 is implemented as a polarization-modulated flash LIDAR system. As shown, the LIDAR system 100 includes a controller 102, a laser source 104, a shutter 108, and image sensors 114, 116. The shutter 108 includes a polarization modulator 130 (e.g., a Pockels cell) which can change the polarization of incident light, a beam splitter 120 (e.g., an analyzing polarizer), and a linear polarizer 106. The controller 102 can include hardware components, software modules, or combinations thereof. In some embodiments, the controller 102 is representative of a variety of computing devices (or systems), including a laptop computer, mobile computer (e.g., a tablet or a smartphone), microcontroller or other embedded system, server, etc.

The controller 102 is configured to control operation of the laser source 104. In one example, the controller 102 triggers the laser source 104 to transmit (or emit or output) a light pulse (e.g., laser pulse, light emitting diode (LED) pulse, etc.) to the scene (or target) 110. As used herein, a light pulse may also be referred to as an optical pulse, an optical signal, an optical waveform, etc. The scene 110 may include multiple different objects 150 located at different distances to the LIDAR system 100. In this example, the object 150A is disposed a first distance di from the LIDAR system 100, the object 150B is disposed a second distance $d_2$ from the system 100 which is greater than the distance $d_1$, and the object 150C is disposed a third distance $d_3$ from the system 100 which is greater than the distance $d_2$.

The controller 102 can generally configure the repetition rate, energy, and duration of the light pulse that is output from the laser source 104. In some embodiments, the light pulse that is output from the laser source 104 may pass through TX optics (e.g., lens, mirrors, diffusers, etc.) before reaching the scene 110. In one reference example, the TX optics can include a set of collimating lenses and an optical diffuser (e.g., rotating diffuser, holographic diffuser, etc.) to provide laser speckle reduction (e.g., reduce coherent artifacts from the light illumination). In some cases, the optical diffuser can be placed at the focal point of the collimating lenses. In some cases, the optical diffuser can be placed over the emitting elements (e.g., LED or vertical-cavity surface-emitting lasers (VCSEL) array). In addition to speckle reduction, the optical diffuser can be used to create an even light field when an array of emitting elements is used. In another reference example, assuming pulsed illumination from a LED is used for the LIDAR system 100, the TX optics may not include a diffusing element.

The light pulse output from the laser source 104 is directed to the scene 110 and is reflected by the objects 150 in the scene 110. That is, the objects 150 each correspond to a different reflection of the pulsed light emitted by the laser source 104. The reflected (or backscattered) light pulses from the objects 150 are initially received at an optical filter 140 that filters out light that has a wavelength or frequency that is different from the wavelength or frequency of the light emitted by the laser source 104. For example, if the laser source 104 emits light with a 940 nm wavelength, the optical filter 140 removes any light that has a frequency greater than or less than this wavelength (within some tolerance (e.g., +/−5%) so the filtered light has substantially the same wavelength as the emitted pulses). This permits the reflected laser pulses to enter into the LIDAR system 100 while removing light at different wavelengths. While FIG. 1 illustrates the optical filter 140 initially receiving the reflections, in other embodiments the optical filter 140 can be placed at other points prior to the sensors 114, 116.

Despite using the optical filter 140, background light can still enter into the LIDAR system 100 which can negatively impact its accuracy as mentioned above. For example, the sun emits radiation that has wavelengths that are the same as the wavelengths of many different types of laser sources. Thus, the optical filter 140 does not stop this solar radiation from entering the LIDAR system 100 and being detected by the images sensors 114, 116. However, as discussed in detail below, the embodiments herein describe techniques for eliminating (or substantially mitigating) the effects of this solar radiation (or any background light that has a similar wavelength as the light emitted by the laser source 104) has on the range calculations generated by the LIDAR system 100.

After passing through the optical filter 140, the light is optionally received at RX optics (e.g., lens, focusing elements, etc.). The shutter 108 includes the linear polarizer 106 which filters out any received light that does not have a predefined polarization (e.g., a linear polarization in a particular direction). In this example, the linear polarizer 106 permits light with only a vertical polarization (e.g., a polarization in the page) to pass through. That is, the linear polarizer 106 is generally used to reject unwanted polarized light from the reflected light pulses so that light entering the polarization modulator 130 has the same initial polarization. For example, assuming the linear polarizer 106 is configured parallel to the emitted linear polarized light (of the light pulse), the linear polarizer 106 can filter out unwanted polarized light to output only linear polarized light parallel to the emitted linear polarized light.

The linearly polarized light can then pass through the polarization modulator 130 in the shutter 108. As used herein, a polarization modulator may also be referred to as a polarization rotator, a tunable waveplate, a modulation cell, etc. As discussed in greater detail below, the polarization modulator 130 selectively changes the polarization of the reflections received from the objects 150. In one embodiment, the polarizations of the reflections are changed to different values depending on the distances the objects 150 are from the LIDAR system 100 and the time at which the reflections arrive at the LIDAR system 100. That is, the reflection caused by the object 150A may have a different polarization after passing through the polarization modulator 130 than the reflections caused by the objects 150B and 150C. Put differently, when the reflected light pulses reach the polarization modulator 130, the reflected light pulses experience a time-of-incidence-dependent phase retardation and a corresponding change in their polarizations, based on a trigger from the controller 102. In some embodiments, the controller 102 may implement a delay pulse generator that triggers the polarization modulator 130 at a certain delay time ($\tau$) (e.g., after triggering the laser source 104) to change the polarization state of the reflected light pulse. The controller 102 can trigger the polarization modulator 130 to change the polarization state by applying a time varying voltage, V(t), to the polarization modulator 130 during a modulating gate time, $T_G$. In some embodiments, the controller 102 can program the delay time, $\tau$, to allow for detecting light that is reflected at different times. For example, $\tau$ can be programmed, such that the shutter 108 is triggered in time intervals $[\tau_1, \tau_2 + T_G], [\tau_2, \tau_2 + T_G]$, etc. As used herein, each time interval $[\tau_i, \tau_i + T_G]$ (where $0 \geq \tau\_i \leq T_G$) may be referred to as a gate time. By programming the delay time, $\tau$, embodiments can allow for the scanning of multiple gate times over multiple cycles.

Figure 2A:
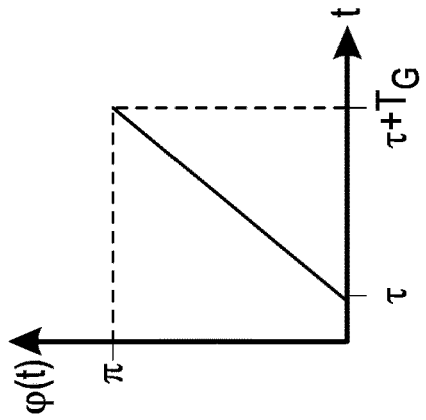
FIG. 2A is a graph of a voltage applied to a Pockels cell as function of time, according to one embodiment.
Figure 2B:
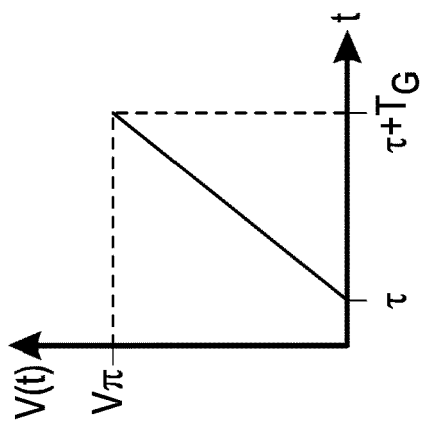
FIG. 2B is a graph of phase retardation of a light pulse as a function of time, according to one embodiment.

FIG. 2A illustrates a reference example of voltage applied to the polarization modulator (e.g., a Pockels cell) as a function of time, according to one embodiment. As shown, when the controller 102 triggers the polarization modulator 130 at time $\tau$, the voltage applied to the polarization modulator 130 begins to increase from zero voltage to the half-wave voltage $V_\pi$ (where $V_\pi$ is the half-wave voltage of a modulating cell having a first order EO effect (also known as the Pockels effect)). Because a phase retardation $\varphi(t)$ is proportional to an applied voltage V(t), the applied voltage V(t) also triggers a change in the phase retardation $\varphi(t)$. Note, in other embodiments, the bias voltage can increase from zero voltage to another voltage (e.g., set below $V_\pi$). For example, a DC bias or passive phase bias can be applied with a voltage swing set below $V_\pi$ in order to operate within more of the linear central region of the intensity modulator transfer function. As shown in FIG. 2B, as the reflected light pulse from scene 110 travels through the polarization modulator 130 during the gate time TG, the reflected light pulse experiences a polarization-dependent phase retardation $\varphi(t)$ and, if a quarter-wave plate is placed after, the linear polarization state is rotated by an angle $\theta(t)$. However, in other embodiments, no quarter-wave plate is used. In some embodiments, the time of flight (ToF) of the reflected light pulse can be determined from the polarization rotation angle of the reflected light pulse.

Note that while FIGS. 2A and 2B depict the bias voltage and phase retardation for a polarization modulator 130, respectively, as increasing linearly with respect to time, in other embodiments, the bias voltage and phase retardation for the polarization modulator 130 may have non-linear shapes (e.g., periodic or sinusoidal waveform). Additionally, for materials exhibiting second order EO effects (e.g., Kerr materials), the phase retardation may be proportional to the voltage squared, and for materials exhibiting higher order EO effects, the phase retardation may have higher order voltage dependence. Regardless of the shape of the phase retardation, in one embodiment, the controller 102 may control the polarization modulator 130 such that the reflections are received when the phase retardation is monotonic. That is, if the polarization modulator 130 has a sinusoidal waveform, the controller 102 can ensure only a monotonic portion of the waveform is used to change the polarizations of the reflections. That way, reflections received at different times are guaranteed to have different polarizations (so long as the reflections are received when the phase retardation applied by the polarization modulator 130 is changing monotonically).

In one embodiment, the LIDAR system 100 can determine the range information based on the measured intensity of the reflected light pulse. In particular, as the polarization state of the light exiting the polarization modulator 130 changes in time, the range can be obtained from detected intensities after the analyzing polarizer (e.g., polarizing beam splitter 120) and knowledge of the changing function (e.g., phase retardation) of the polarization modulator 130. In FIG. 1, for example, reflected light is linearly polarized using a linear polarizer 106. Next, an EO component (e.g., Pockels component, Kerr component, or higher order EO component) of the polarization modulator 130 modifies the linear polarization based on its time of flight (ToF)—i.e., when the reflections are received at the LIDAR system 100. Optionally, the LIDAR system 100 can include a quarter waveplate that converts a generally elliptical polarization output by the polarization modulator 130 into a linear polarization, and the polarizing beam splitter 120 splits the linearly polarized light between two different image sensors 114 and 116. In particular, a first polarized component (e.g., s-polarized light) is sent to (or detected by) the image sensor 114 (e.g., the s-channel) and a second orthogonally polarized component (e.g., p-polarized light) is sent to (or detected by) the image sensor 116 (e.g., the p-channel). Note, however, this is merely an example and that, in other embodiments, the LIDAR system 100 may include other types of analyzing polarizers that may behave differently.

The image sensors 114, 116 measure the respective intensities of the polarized components, and use the intensity information to compute the ranges (e.g., the distances $d_1$, $d_2$, and $d_3$) between the LIDAR system 100 and the objects 150 in the scene 110. For example, the relative intensities of light at the image sensors 114 and 116 are used to extract the polarization angle.

Note that the LIDAR system 100 depicted in FIG. 1 is provided as a reference example of a LIDAR system 100 in which the techniques presented herein can be used. In other embodiments, the techniques presented herein can be used in other LIDAR system configurations which do not include a polarization modulator 130 as a shutter 108. Instead, the shutter 108 can be any device capable of modulating light at relevant timescales when one or more reflections are received at the LIDAR system 100. Other suitable techniques for fast on/off modulation of light that can be used as the shutter 108 include photoacoustic devices (e.g., accousto optic modulation), photoelastic devices, Kerr effect and Pockels effect devices, carrier injection or electro-absorption (e.g., multi-quantum well stacks), and semiconductor saturable absorber mirrors (SESAM). These types of shutters may correspond to different functions than the phase retardation exhibited by a polarization modulator when switching between on and off states (or high/low states). For example, the shutter may exhibit a function of varying opacity as the shutter switches between a transparent (on) state and an opaque (off) state. In general, the function of the shutter is to change the intensity of the light, where the embodiment in FIG. 1 uses polarization as an intermediate stage to accomplish this task. The detectors measure an intensity. Whatever the means of modulation, the shutter converts the returned pulses to a variation in the intensity so that it can be measured by the detector. For example, SESAMs and electro-absorption would directly modify the opacity via an absorption mechanism. Accoustooptic modulation could use beam deflection to modulate the intensity of the returned pulses. In any case, the function may change a characteristic of the reflected pulses (e.g., intensity) that is dependent on the time the reflected pulses are received, similar to the polarization modulator changing the polarization of the reflected pulses depending on when they enter the shutter.

Figure 3:
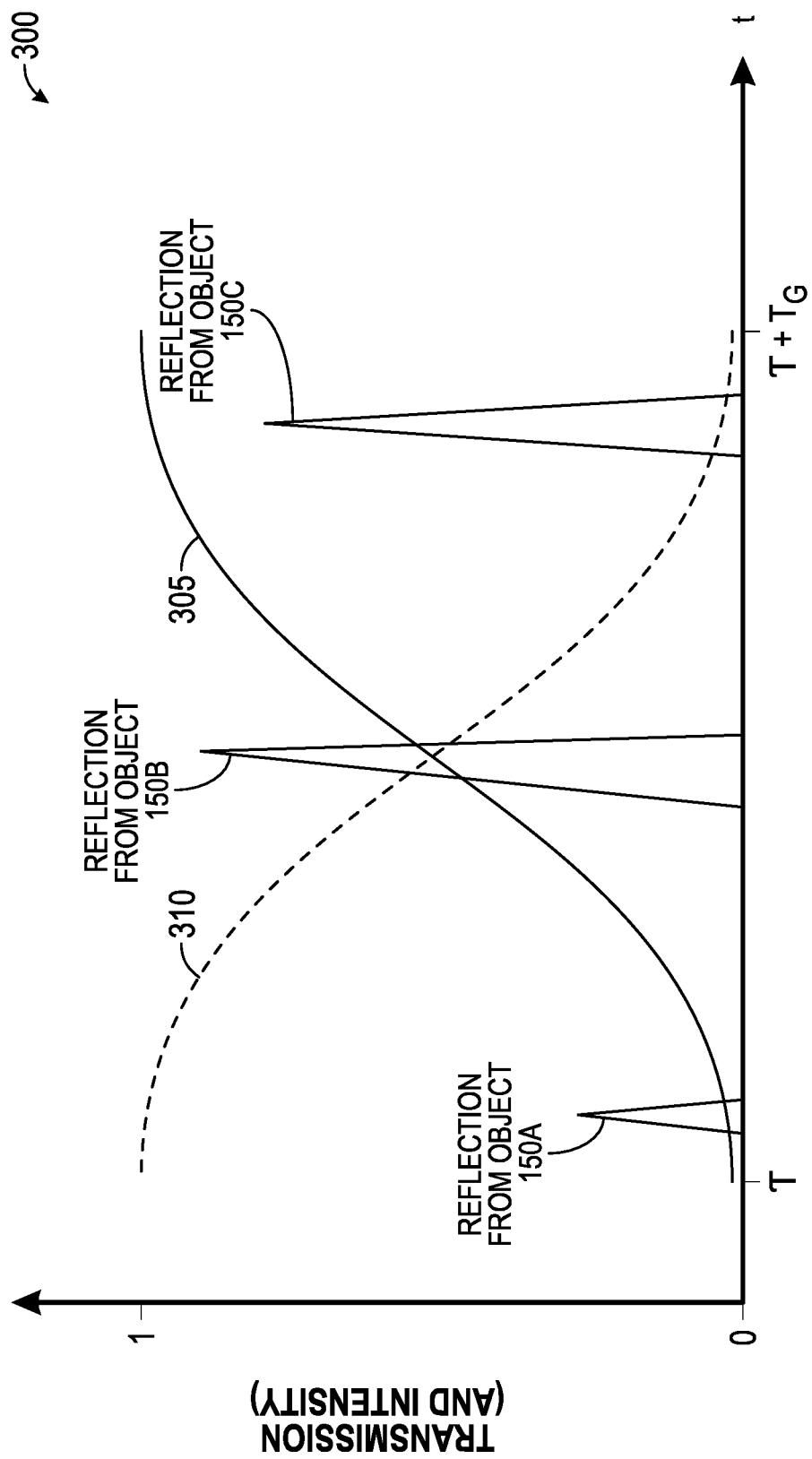
FIG. 3 is a graph indicating shutter transmission for three received reflections, according to one embodiment.

FIG. 3 is a graph 300 indicating shutter transmission for three received reflections corresponding to the three objects 150A-C illustrated in FIG. 1, according to one embodiment. As shown, the reflections from the objects 150A-C are received at different times at the shutter, as indicated by their different positions on the X-axis (which measures time). Further, each of these returning pulses would have different angles of incidence into the optical receiver (since the objects are located at different locations in the environment). This angle of incidence is converted, by the final imaging optics, into a unique position on the focal plane. Thus, each returned pulse is spatially multiplexed onto independent pixels of the image sensors due to the angle of incidence.

As discussed above, the controller can synchronize the laser source to the shutter so that the reflections from the objects in the scene are received while the phase retardation of a polarization modulator changes monotonically. In this example, the phase retardation (i.e., the polarization state) changes from a p-polarization to a s-polarization (e.g., on/off states or high/low states), but in another embodiment, the reflections may be received when the phase retardation is changing from the s polarization to the p-polarization. Further, the embodiments herein can be used with different types of shutters which have fast on/off modulation of light. That is, instead of receiving the reflections during a change in phase retardation, the reflections can be received as a shutter changes from light to dark (or dark to light) in a monotonic manner (rather than instantaneously). Thus, the embodiments herein are not limited to a polarization modulator, but can be used with any type of fast shutter that exhibits a monotonically changing function when switching between on/off or high/low states, where the controller can synchronize the laser such that the reflections are received during the monotonic function so that the function changes a characteristic of the reflections that is dependent on the time the reflections are received. In one embodiment, the gate time, $T_G$, is approximately 20 ns.

The graph 300 illustrates three reflections caused by the same pulse generated by the laser source. As already mentioned, the location of the reflections on the X-axis indicates the distance of the objects 150A-C from the LIDAR system. The intensity of the reflections (as measured by the Y-axis) varies according to at least two factors: the reflectivity of the object (e.g., its color) and the distance between the object and the LIDAR system. Thus, an object that is further away from the LIDAR system may still generate a reflection that has a greater intensity than a reflection from an object closer to the LIDAR system, depending on the reflectivity of the objects.

Depending on when the reflections arrive at the polarization modulator determines their resulting polarization when leaving the shutter. As illustrated in FIG. 1, when entering the polarization modulator, the light of the reflections has the same polarization (due to the linear polarizer 106). The polarization modulator has a small effect on the polarization of reflections received near the beginning of the gate time (as the case of the reflection from the object 150A). That is, the reflection from the object 150A has substantially the same polarization exiting the polarization modulator that it had when entering the polarization modulator.

However, the later a reflection is received, in this embodiment, the greater effect or change the polarization modulator has on the polarization of the reflection. In FIG. 3, the polarization retardation causes a change to the transmission to each output of the beam splitter (shown as solid and dashed curves 305 and 310 in the figure). Depending on the implementation, each curve could correspond to the transmission of the optical path leading to sensor 114 and 116 or vice versa. In other embodiments, the curves may have a different, but monotonic shape. That is, the polarization modulator changes the polarization of the reflection from object 150C more than the polarization of the reflection of object 150B which is received earlier during the gate time. As a result, the change in polarization introduced by the polarization modulator produces a different transmission through the beam cube and indicates the distance of the object causing the reflection from the LIDAR system. That is, because the reflection from the object 150C has more of a s-polarization than the reflection from the object 150A which has more of a p-polarization, this indicates the object 150C is further from the LIDAR system than the object 150A. In one embodiment, the solid curve 305 indicates the transmission of the shutter for the s-channel while the dashed curve 310 indicates the transmission of the shutter for the p-channel. Thus, the later the reflection reaches the LIDAR system, the more of the intensity of the light is measured by the s-channel. The reverse is true for the p-channel—i.e., the earlier the reflection reaches the LIDAR system, the more of the intensity of the light is measured by the p-channel. Further, the curves 305, 310 assume a linear sweep of the phase retardation (which is also linear with voltage). As discussed below, because the change in the phase retardation is known, the LIDAR system can use the polarization of the reflections to determine the range or distance to the various objects 150 in the scene.

Figure 4:
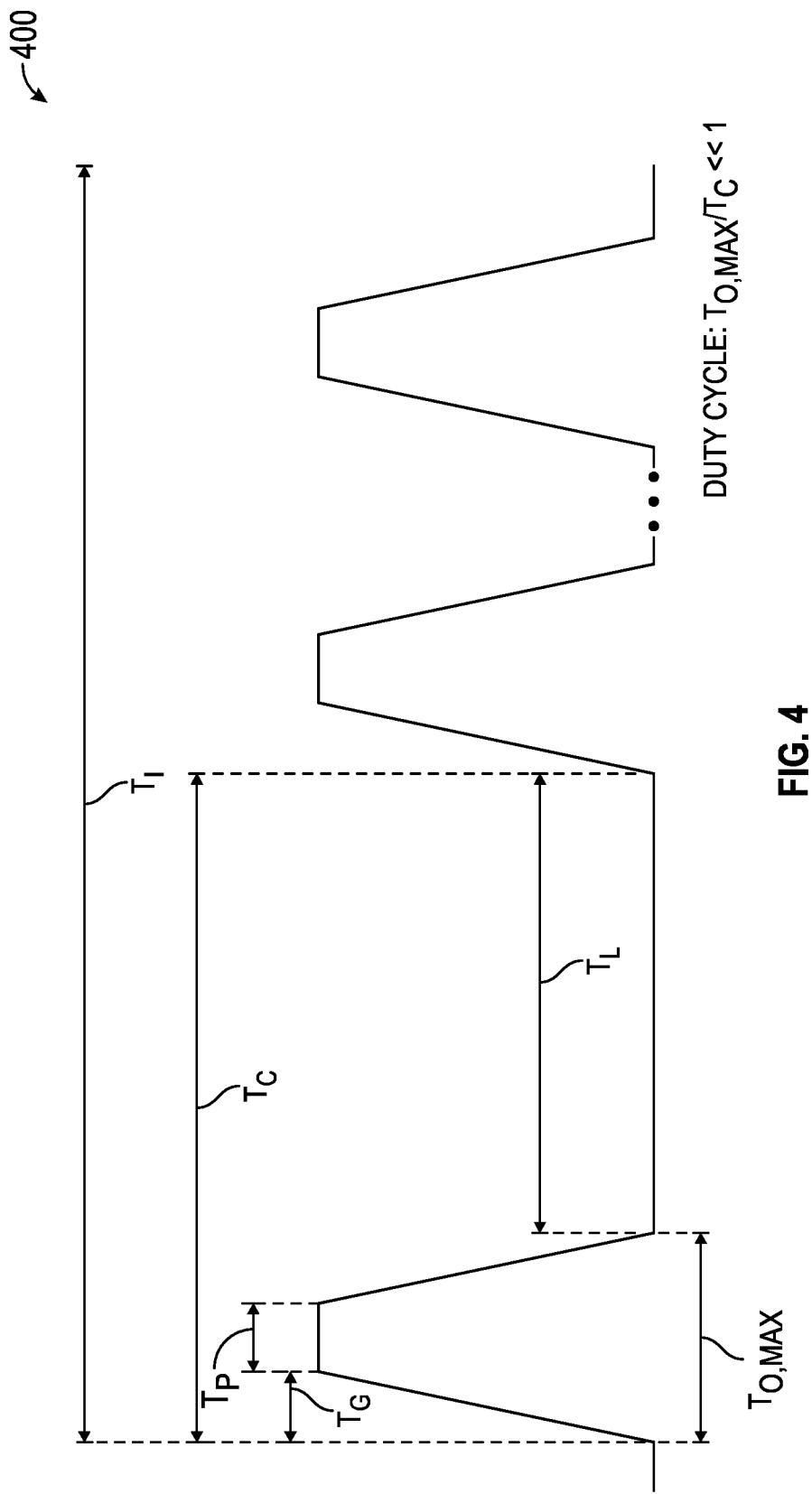
FIG. 4 is a timing diagram of operating a shutter, according to one embodiment.

FIG. 4 is a timing diagram 400 of operating a shutter, according to one embodiment. The timing diagram 400 may represent a control signal for the shutter (or more specifically, for the polarization modulator) such as voltage or current. The timing diagram 400 includes multiple cycles, $T_C$, which occur over an integration period, $T_I$. That is, an integration period can include a plurality of cycles. During the integration period, the image sensors 114, 116 in FIG. 1 may measure the intensity of the light to generate a depth map of the scene. For example, the integration period $T_I$ may be less than 1 millisecond to 100 milliseconds or more while the cycle time $T_C$ may be between 1 microsecond and 1 millisecond.

Figure 8:
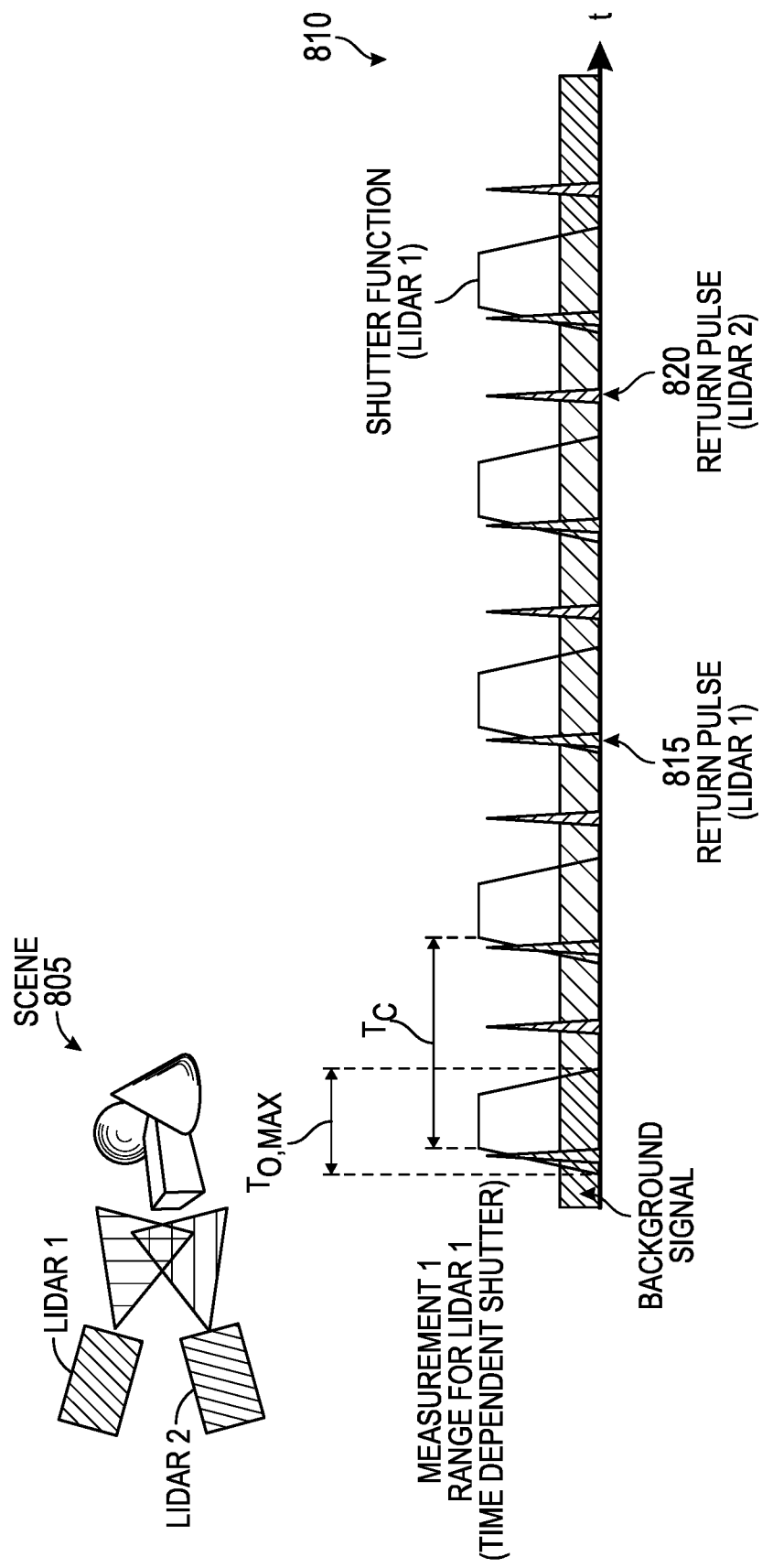
FIG. 8 illustrates non-interference between LIDAR systems using shutter-based approaches, according to one embodiment.

Within each cycle, the timing diagram 400 turns "on" the polarization modulator during a plateau time period, $T_P$ (e.g., an on or high state) and turns "off" the polarization modulator during an off or low time period TL (e.g., an low or off state). In one embodiment, $T_P$ ranges from 100 nanoseconds to 10 microseconds while the $T_L$ is the remaining time in the cycle time $T_C$. The duty cycle is the fraction of time the shutter is "on" over a cycle time, $T_C$, and depends on the exact shape of the curve in FIG. 4 but can be approximated by including the rise/fall times in the "on" state. The ratio of $T_{O,max}$, the plateau time period plus the rise/fall times (and is illustrated in FIGS. 4 and 8), and Tc determines the upper limit of the duty cycle of the polarization modulator. In one embodiment, the shutter has a small duty cycle where the time the shutter is on/high is much shorter than the time the shutter is off/low—i.e., $T_{O,max} \ll T_C$.

Each cycle has two gate time periods, $T_G$, where the controller drives the shutter to the on state and back down to the off state. $T_G$ (also referred to as the rise/fall interval) may range from 10 picoseconds to 10 microseconds depending on the type of shutter being used. As shown in FIG. 3, the shutter is synchronized with the laser such that most (or all) of the reflections are received during the gate time TG.

When the polarization modulator is in the on and off states, background light reaches at least one of the image sensors. That is, the solar radiation can raise the noise level such that the inherent fluctuations from this light overwhelms the reflections from the emitted laser pulse or makes them too insignificant to detect. Furthermore, when a polarization modulator is used as a shutter, at least one of the image sensors may still detect light when the modulator is in the low/off state during $T_L$. Because the polarization modulator is not a physical shutter, during the off state, background light still passes through the shutter (although it its polarization is not rotated) and strikes the p-channel image sensor. Thus, because the p-channel image sensor receives background light whenever the shutter is in the off state during each cycle (and because TL may be much larger than $T_P$, which is when the s-channel image sensor receives the background light), the measurement derived from the p-channel image sensor may saturate and be unusable for range detection, since any measurement derived from the reflections is much smaller than the measurement derived from the background light over the integration period $T_I$. That is, since the shutter is only on for a short amount of time ($\sim T_P$), one of the channels (e.g., one of the image sensors) integrates mostly background signal (in proportion to 1−d, where d is the duty cycle), while the other channel integrates only a little (in proportion to d), where d<<1. During a ranging measurement, the ratio of signal-to-background in one of the channels will be very low (e.g., the p-channel) while the opposite channel (s-channel) will be much higher. Advantageously, once the background has been subtracted in a ranging measurement, the signal-to-noise ratio in the p- or s-channel is (according to shot noise limit):

$$SNR_{|p\rangle} \propto \frac{I_{|p\rangle}}{\sqrt{I_{|p\rangle} + (1-d)I_b}} \qquad (1)$$

-continued $$SNR_{|s\rangle} \propto \frac{I_{|s\rangle}}{\sqrt{I_{|s\rangle} + dI_b}} \qquad (2)$$

In Equations 1 and 2, the signal-to-noise ratio (SNR) of the p- and s-channels are given. Here, $I_{|p\rangle}$ and $I_{|s\rangle}$ are the intensities incident on each image sensor (114 and 116 in FIG. 1), respectively, while $I_b$ is the intensity of the background light. Even though the LIDAR system can subtract off the background "pedestal", there are still large noise fluctuations in the p-channel due to $(1-d)I_b$. Conversely, the fluctuations in the s-channel are much smaller. In contrast, indirect imaging time-of-flight systems have large duty cycles (e.g. 50%) and thus integrate a large amount of background light. In other words, the embodiments here do not just subtract the amount of background light in our scheme, but the hardware integrates only a small amount of background light. Later measurements (as described below) enable the LIDAR system to subtract off this small amount of background light and also do normalization. The background subtracted signal will have exceptionally high signal-to-noise (SNR) because of the fast shutter which allows for very small duty cycles not possible with other methods. Another advantage of this low duty cycle is that the dynamic range of one of the channels (e.g., the s-channel) is not exhausted by integrating large amounts of background light. This allows for longer integration times before saturating the image sensor, which will further improve the SNR.

Figure 5:
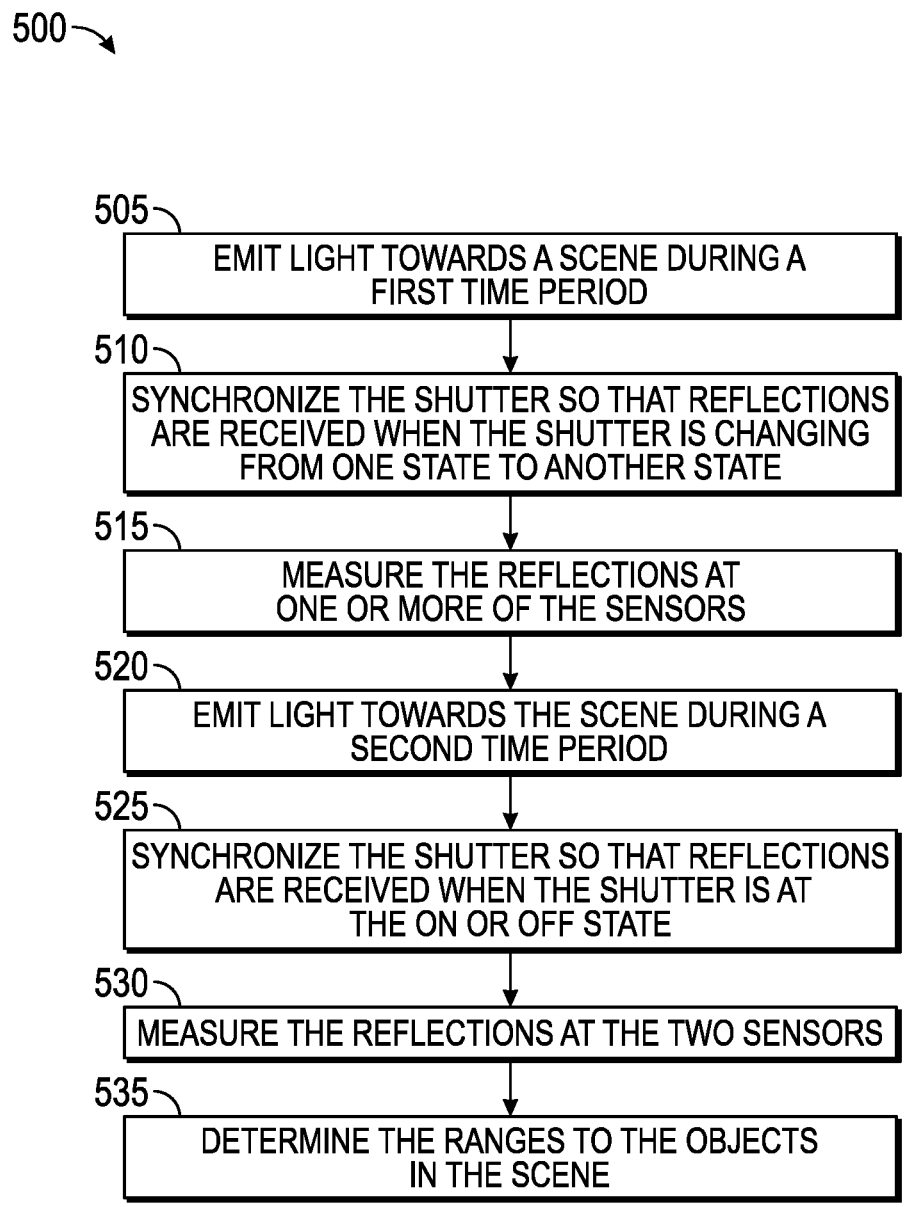
FIG. 5 is a flowchart for operating a LIDAR system to remove background light from a range measurement, according to one embodiment.

FIG. 5 is a flowchart of a method 500 for operating a LIDAR system to remove background light from a range measurement, according to one embodiment. At block 505, the LIDAR system emits light (e.g., a series of light pulses) towards a scene during a first time period (e.g., a first integration time period $T_I$). The series of pulses may strike multiple objects in the scene and result in multiple reflections that arrive at the LIDAR system at different times due to the distances between the objects and the LIDAR system. Moreover, these reflections can have different intensities based on the distances between the LIDAR system and the objects as well as the reflectivity (e.g., surface type and color) of the objects.

At block 510, a controller in the LIDAR system synchronizes the shutter so that reflections are received when the shutter is changing from one state to another state. For example, assuming the shutter is implemented using the polarization modulator, the timing when the polarization modulator begins to change the phase retardation (i.e., the gate time $T_G$ in FIG. 4) is aligned with when the LIDAR system expects to receive the reflections from the objects in response to emitting a single laser pulse. This is shown in FIG. 6A.

Figure 6A:
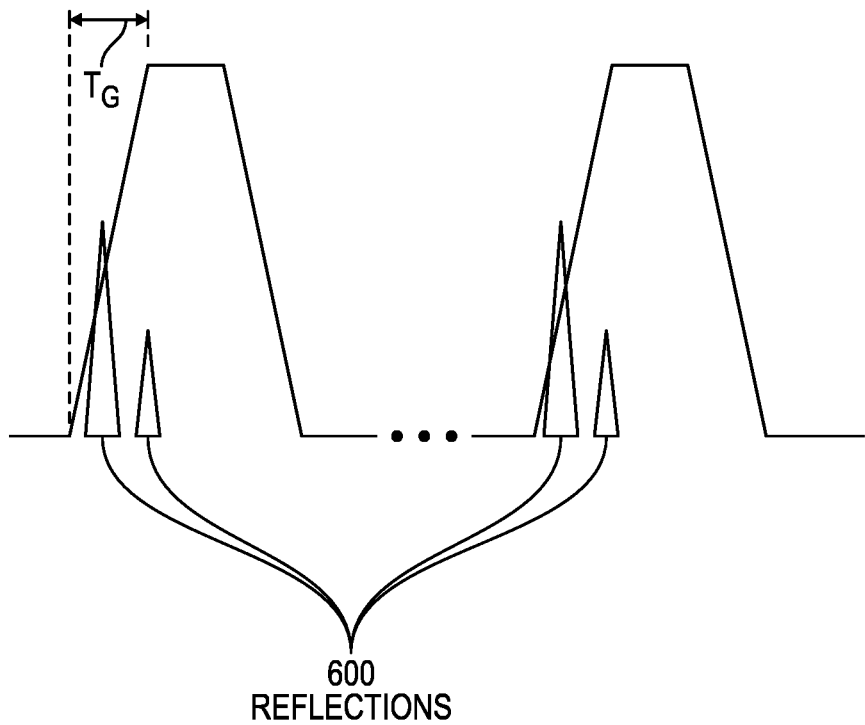
FIGS. 6A and 6B illustrate synchronizing the shutter to receive reflections during different periods of the timing diagram in FIG. 4, according to one embodiment.

FIG. 6A illustrates synchronizing the shutter to receive reflections 600 during the gate time TG of the timing diagram 400 in FIG. 4, according to one embodiment. FIG. 6A can represent any shutter (not just a polarization modulator) that has a function that increases or decreases monotonically when the shutter switches between the on and off states. FIG. 6A illustrates two reflections 600 from two different objects being received during the gate time TG. As the cycle in the integration repeats, the controller also emits a new laser pulse, thereby generating two new reflections 600 which are again received during a gate time TG. Thus, assuming the shutter is a polarization modulator, reflections received at different times are changed to different polarizations.

Because a polarization modulator applies different polarizations to reflections received from objects at different distances, these reflections are routed differently by the beam splitter 120 in FIG. 1. Reflections that arrive later have more of a s-polarization and thus are reflected by the beam splitter 120 towards the image sensor 114 (e.g., the s-channel) while reflections that arrive near the beginning of TG have more of a p-polarization and essentially pass through unabated by the beam splitter 120 towards the image sensor 116 (e.g., the p-channel). Reflections arriving at the beam splitter 120 between the end and beginning of TG have a mix of s- and p-polarized field components as described by:

$$\sin\theta(t)|s\rangle + \cos\theta(t)|p\rangle \qquad (3)$$

where $\theta(t)$ is the linear polarization rotation angle as a function of time. In some embodiments (e.g., without a quarter wave plate present) the reflections would have a different representation than the one given by Equation 3. The reflections arriving in the middle of $T_G$ have their light divided between the s- and p-channels. Because the LIDAR system knows how the phase retardation of the polarization modulator changes polarization over time, the system can measure the range. The total intensity from emitted laser reflections, $I_0$, is given by:

$$I_0|I_s\rangle + I_{|p\rangle} \qquad (4)$$

where $I_{|s\rangle}$ and $I_{|p\rangle}$ are the intensities incident on each image sensor, respectively. Depending on the mechanism of the beam splitter, each sensor could receive the opposite intensity (e.g., $I_{|s\rangle}$ and $I_{|p\rangle}$ could be incident on sensors 116 and 114, respectively).

At block 515, the LIDAR system measures the reflections received during the first time period (e.g., the first integration period $T_I$) using at least one of the sensors. The intensity of light measured at the s-channel image sensor at the first time period can be represented by:

$$I_{|s\rangle}^{(1)} = I_{|s\rangle} + I_b d \qquad (5)$$

where indicates $I_{|s\rangle}^{(1)}$ the total intensity of light measured by the s-channel image sensor during the first time period, $I_{|s\rangle}$ is the intensity of light measured by the sensor caused by the reflections, and $I_b d$ is the intensity of light measured by the sensor caused by background light. The d is the duty cycle of the cycles in the first time period which is approximated by $T_{O,max}/T_C$ (this is an upper bound for the duty cycle in which the ramp/fall intervals $T_G$ are considered to be fully on). The background term under these conditions is $I_b d$ (but may be smaller than this term since the duty cycle was overestimated by approximating the rise/fall intervals as fully on). Because in one embodiment, $T_{O,max}$ is much smaller than $T_L$, the effect of the background light on the measurement obtained by the s-channel image sensor is typically small, and thus, the background light is unlikely to saturate the sensor during the integration period.

In contrast, the intensity measured by the p-channel image sensor during the first time period is much more likely to saturate due to background light. The total intensity incident on the p-channel image sensor during the first time period can be represented by:

$$I_{|p\rangle}^{(1)} = I_{|p\rangle} + I_b(1-d) \qquad (6)$$

where indicates $I_{|p\rangle}^{(1)}$ the total intensity of light measured by the p-channel image sensor during the first time period, $I_{|p\rangle}$ is the intensity of light measured by the sensor caused by the reflections, and $I_b(1-d)$ is the intensity of light measured by the sensor caused by background light.

Because d is a small number in this example, 1−d is closer to one to indicate that the background light has a much larger effect on the total intensity measured by the p-channel image sensor than the s-channel image sensor, thus greatly increasing the likelihood that the measurement obtained from the p-channel will saturate, or have a large amount of noise, even if the background is subtracted. Thus, in bright, sunny conditions, the measurement obtained from the p-channel may be unusable. In an environment with a significant amount of background light at the same wavelength as the laser source, the LIDAR system may only use the measurement from the s-channel image sensor but discard (or ignore) the measurement from the p-channel image sensor. However, in environments without substantial background light, the measurement from the p-channel image sensor may be usable for determining range. That is, based on the two measurements obtained using the two image sensors, the LIDAR system can determine a range to the various objects in the scene. However, the method 500 assumes that the p-channel measurement cannot be used, and thus, proceeds to blocks 520-535.

At block 520, the LIDAR system emits light (e.g., a series of pulses) towards the scene during a second time period (e.g., a second integration period $T_I$). In one embodiment, the second time period may immediately follow the first time period, although this is not a requirement. For example, the LIDAR system may obtain several sequential measurements using the techniques described in blocks 505-515 before then performing the techniques described at blocks 520-530.

At block 525, the controller synchronizes the shutter so that reflections are received when the shutter is at the on or off state. Again using the polarization modulator as an example, the modulator can be controller so that the reflections are received during $T_P$ when the polarization modulator changes the reflections to have the same s-polarization regardless of when they are received, or during $T_L$ when the reflections will have the p-polarization regardless of when they are received. That is, the reflections are received when the phase retardation function of the polarization modulator is constant. That is, after exiting the shutter, the reflections have the same polarization regardless of when they were received, unlike at block 510 where the polarization of the reflections is dependent on their arrival time.

Figure 6B:
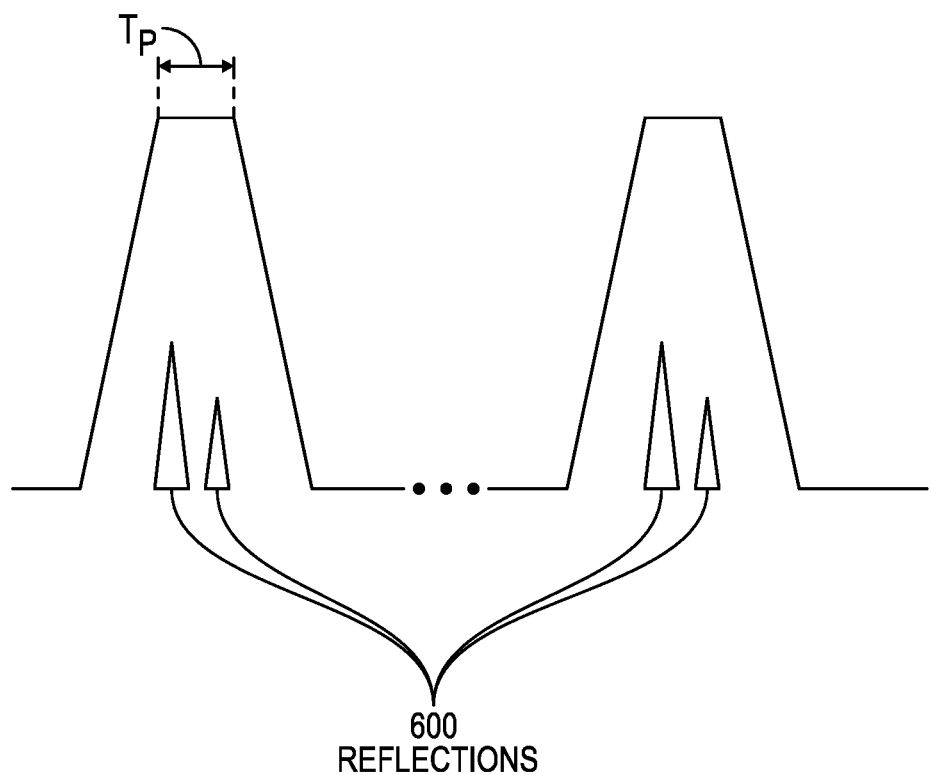

FIG. 6B illustrates synchronizing the shutter such that the reflections 600 are received during the on state—i.e., $T_P$—of each cycle. These reflections 600 may be caused by the same objects that generated the reflections 600 in FIG. 6A, but due to a different synchronization between the laser source and the shutter, the reflections 600 are received in a different time period.

Returning to the method 500, at block 530, the LIDAR system measures the reflections at the two sensors. The intensity of light measured at the s-channel image sensor at the second time period can be represented by:

$$I_{l_s})^{(2)} = I_0 + I_b d \qquad (7)$$

where indicates $I_{l_s})^{(2)}$ the total intensity of light measured by the s-channel image sensor during the second time period, $I_0$ is the intensity of light measured by the sensor caused by the reflections, and $I_b d$ is the intensity of light measured by the sensor caused by background light. Because the reflections have the same polarization during the second time period (e.g., the phase retardation function is constant), Equation 7 is a normalization measurement that can be used to account for the reflectivity of the objects (e.g., the fluctuations in the intensity of the reflected light caused by the color and the surface texture of the objects). Again, because of the small duty cycle, the background light has a small effect on this normalization measurement.

Like above, the intensity measured by the p-channel image sensor during the second time period is much more likely to saturate due to background light, but instead of using the measurement from the p-channel to determine range (or provide normalization), its measurement can be used to obtain a measurement of the background light. In one embodiment, because this background measurement could saturate the detector, the LIDAR system may perform the second measurement with a shorter integration time. The LIDAR system would then scale the second measurement to correspond to the same integration time as the first range measurement. For example, if the second measurement was only for 50 ms, but the first measurement was integrated for 100 ms, then the LIDAR system would multiply the second measurement by two before using the two measurements in a calculation together. The total intensity measured by the p-channel image sensor during the second time period can be represented by:

$$I_{l_p})^{(2)} = I_b(1-d) \qquad (8)$$

where $I_{l_p})^{(2)}$ indicates the total intensity of light measured by the p-channel image sensor during the first time period, and $I_b(1-d)$ is the intensity of light measured by the sensor caused by background light. Note that the p-channel measurement does not have a component due to the reflections since all the reflections have the s-polarization, and thus, are routed primarily to the s-channel image sensor during the second time period. Thus, Equation 8 can be used to determine the intensity of light (on a pixel-by-pixel basis) caused by the background light.

Although FIG. 6B was described as the s-channel image sensor receiving the normalization measurement during the on state and the p-channel image sensor used to measure the background light during the off state, this can be reversed. It can vary depending on whether voltage pulses are applied to the polarization modulator (e.g., Pockels cell) or the voltage is high and dips to zero periodically. The main point with the blocks 520-525 is that the shutter function (e.g., phase retardation) directs light to p- and s-channel image sensors when the function is high/on state or low/off state (or low and high). In this way the image sensors get complimentary information (normalization+a little bit of background light, or just pure background light).

At block 535, the LIDAR system determines the ranges to the objects in the scene based on the measurements obtained at block 515 and 530. The various techniques for performing block 535 are described below in FIG. 7.

While the method 500 describes using the p-channel image sensor to measure the amount of background light during the second time period, this is not a requirement. In another embodiment, the method 500 may include a third time period (e.g., a third integration time period $T_I$) where the laser is synchronized with the shutter such that the reflections are received when the shutter has an off state. That is, instead of the reflections 600 being received at $T_G$ or $T_P$ as shown in FIGS. 6A and 6B, they are received at $T_L$ during the third time period. Obtaining the background light measurement during a third time period can be used for a polarization modulator where, instead of a beam cube and two sensors, the LIDAR system includes a polarizer and a single imaging sensor or an imaging sensor with a micropolarizing array lithographically patterned directly onto it. Further, obtaining the background light measurement during a third time period may be used when the shutter is implemented using a different type of shutter than a polarization modulator. That is, obtaining the background light measurement using a third time period (or more specifically, during the plateau time or on/high state during the cycles) is a generalized version that could be applied to obtain the background rejection scheme for different types of fast shutters which do not use a polarization modulator and a beam splitter. These types of shutters may have only one image sensor, in which case, since the reflections are not received during the on state, the image sensor (which may receive light only during the on state (or during the shorter time period as selected between the on and off states)) receives only the background light during the third time period which can be used to obtain the background light measurement.

FIG. 7 is a flowchart of a method 700 for removing background light from a range measurement and a normalization measurement, according to one embodiment. The method 700 describes several techniques for performing block 535 in the method 500. The method 700 can be used if the background light measurement is obtained in parallel with the normalization measurement (if a polarization modulator and beam splitter is used) or if the background light measurement is obtained during a separate time period than the normalization measurement (e.g., a third time period) if a different type of fast shutter is used which may have only one image sensor.

At block 705, the LIDAR system uses the measurement obtained during the first time period as the range measurement. That is, if the shutter includes a polarization modulator, the measurement obtained by the s-channel image sensor during the first time period is used as the range measurement (i.e., $I_{|s\rangle}$ )$^{(1)}$ from Equation 5) while the measurement obtained by the p-channel image sensor (i.e., $I_{|p\rangle}$ )$^{(1)}$ from Equation 6) may be ignored. If a different type of fast shutter is used which has only one image sensor, the LIDAR system can still obtain the range measurement by synchronizing the laser such that the reflections arrive when the shutter is in the process of switching between the on and off states (e.g., switching from being opaque to being transparent) in order to obtain the range measurement during the first time period.

At block 710, the LIDAR system uses the measurement obtained during the second time period as a normalization measurement where the reflections are received during the on state— e.g., $I_{|s\rangle}$ )$^{(2)}$ from Equation 7. Of course, the same normalization measurement can be obtained using different types of shutters where the on state may be when the shutter is transparent.

At block 715, the LIDAR system uses the measurement obtained by the p-channel image sensor during the second time period, or a measurement obtained during a third time period as a background measurement. That is, if the polarization modulator is used, the background measurement can be obtained in parallel along with the normalization measurement during the second time period—e.g., $I_{|p\rangle}$ )$^{(2)}$ from Equation 8. However, for other types of shutters, the background measurement can be obtained during a third time period where purely the background light is received during the on or off state. Further, the laser can be off when measuring the background light during a third time period.

At block 720, the LIDAR system removes the effects of the background light from the range measurement and the normalization measurement using the background measurement. In one embodiment, the background measurement is subtracted from the range and normalization measurements as shown below (using the measurements from Equations 5-8 as examples):

$$I_{|s\rangle}^r = I_{|s\rangle}^{(1)} - \left(\frac{d}{1-d}\right)I_{|p\rangle}^{(2)} \quad (9)$$

$$I_{|s\rangle}^n = I_{|s\rangle}^{(2)} - \left(\frac{d}{1-d}\right)I_{|p\rangle}^{(2)} \quad (10)$$

where $I_{|s\rangle}$ )$^r$ is the corrected range measurement and $I_{|s\rangle}$ )$^n$ is the corrected normalization measurement where the effects of the background light have been removed.

At block 725, the LIDAR system identifies the range (e.g., distance) to the objects in the scene by normalizing the range measurement using the normalization measurement to remove the effect that the reflectiveness (e.g., color and surface type) of the objects has on the intensity of the reflections. Using the measurements in Equation 6 and 7, the range (R) can be determined using:

$$R = R_G \frac{\arcsin\sqrt{I_r/I_n}}{\pi/2} \quad (11)$$

Further, the range calculation in Equation 11 may have a different form depending on the type of shutter being used. In one embodiment, the LIDAR system can perform the range calculation in Equation 11 on a pixel-by-pixel basis to generate a depth image or map. That is, each depth measurement can be assigned a different brightness (e.g., a different shade of grey) which can be used to generate a depth image. In the absence of background noise (or light), the range can be estimated entirely from the first measurement in Equation 5 (where the background term is zero) and then used in Equation 11 to identify the range.

Further, the method 700 can be used with multiple switching transfer functions and switching times, where the switching time can be adjusted in hardware or using digital sampling techniques.

FIG. 8 illustrates non-interference between LIDAR systems using shutter-based approaches, according to one embodiment. That is, FIG. 8 illustrates two LIDAR systems: LIDAR 1 and LIDAR 2 that are sensing a same scene 805 in parallel. That is, LIDAR 1 emits a series of pulses that are reflected by the scene 805 during a same time period (or integration period) as LIDAR 2 emits a series of pulses that are reflected by the scene 805. However, because the LIDAR systems use a fast shutter and a small duty cycle, the likelihood that the reflections generated by LIDAR 1 are received by LIDAR 2 and vice versa can be very small, even when the LIDAR systems are not synchronized, thereby providing another advantage of using the LIDAR systems discussed in the previous examples.

The chart 810 in FIG. 8 illustrates the timing diagram for the shutter in LIDAR 1. As shown, τ indicates the on state of the shutter (which includes the ramp up and ramp down when the shutter transitions between the on and off states) while $T_C$ is the cycle time. With a fast shutter, the duty cycle can be small—e.g., Duty cycle=$T_{O,max}/T_C$<<1 (e.g., where the on state is $\frac{1}{100}^{th}$ or less than a duration of an off state). For example, typical values of the duty cycle of the shutters discussed above can be 0.001<$T_{O,max}/T_C$<0.01. Because fast shutters (like the polarization modulator or any of the other types discussed above) permit small duty cycles, the probability of a shutter function overlapping with a second LIDAR is unlikely. Thus, LIDAR systems operating in the same environment may not need to be synchronized. As shown in the chart 810 a return pulse 815 (or reflection) generated by the laser source in LIDAR 1 is received at the desired gate time, while a return pulse 820 generated by the laser source in LIDAR 2 is received during the off state of the shutter in LIDAR 1, thereby not affecting its range measurement. Stated differently, because the LIDARs 1 and 2 have very small duty cycles, it is highly likely that reflections or return pulses corresponding to the other LIDAR system will be received during the off states in the cycles, which does not affect the range measurement. Thus, the cost and complexity associated with synchronizing the LIDAR systems can be avoided.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A light detection and ranging (LIDAR) system, comprising:
   a laser source configured to emit light pulses into an environment;
   a polarization modulator configured to receive reflections caused by the light pulses;
   a beam splitter arranged at an output of the polarization modulator;
   a first image sensor arranged at a first output of the beam splitter;
   a second image sensor arranged at a second output of the beam splitter; and
   a controller configured to:
   synchronize the laser source and the polarization modulator so that the reflections are received during a first time period when a phase retardation of the polarization modulator changes monotonically;
   measure, during the first time period, an intensity of the reflections using the first image sensor to obtain a range measurement;
   synchronize the laser source and the polarization modulator so that the reflections are received during a second time period when a phase retardation of the polarization modulator is constant;
   measure, during the second time period, an intensity of the reflections using the first image sensor to obtain a normalization measurement and an intensity of background light using the second image sensor to obtain a background measurement; and
   determine a range to objects in the environment based on the range measurement, the normalization measurement, and the background measurement.

2. The LIDAR system of claim 1, wherein the first time period comprises a first integration period during which the first image sensor measures the intensity of the reflections, wherein the first integration period comprises a plurality of cycles, each comprising a gate time when the phase retardation changes monotonically, a plateau time, and an off time, wherein the phase retardation is constant during the plateau time and the off time.

3. The LIDAR system of claim 2, wherein a duty cycle of each of the plurality of cycles is equal to or less than 0.1.

4. The LIDAR system of claim 2, wherein the second time period comprises a second integration period, wherein the second integration period comprises a second plurality of cycles, each comprising the gate time, the plateau time, and the off time, wherein the first image sensor measures the intensity of the reflections during one of the plateau time or the off time and the second image sensor measures the background light during one of the plateau time or the off time.

5. The LIDAR system of claim 1, further comprising:
   an optical filter configured to permit only light with substantially the same wavelength as the light pulse to enter into the polarization modulator; and
   a polarizer configured to permit only light with a predefined polarization to enter into the polarization modulator.

6. A LIDAR system, comprising:
   a laser source configured to emit light pulses into an environment;
   a shutter configured to receive reflections caused by the light pulses;
   at least one image sensor configured to receive light passing through the shutter; and
   a controller configured to:
   synchronize the laser source and the shutter so that the reflections are received during a first time period when the shutter is in the process of switching between on and off states;
   measure, during the first time period, an intensity of the reflections to obtain a range measurement;
   synchronize the laser source and the shutter such that the reflections are received during a second time period when the shutter is at one of the on state or the off state;
   measure, during the second time period, an intensity of the reflections to obtain a normalization measurement;
   measure, during at least one of the second time period or a third time period, an intensity of background light to obtain a background measurement; and
   determine ranges to objects in the environment based on the range measurement, the normalization measurement, and the background measurement.

7. The LIDAR system of claim 6, wherein, when in the process of switching between the on and off states, a function of the shutter changes monotonically.

8. The LIDAR system of claim 7, wherein the reflections are received at the shutter at different times such that the function of the shutter changes a characteristic of the reflections depending on when each of the reflections is received at the shutter.

9. The LIDAR system of claim 7, wherein the function of the shutter is constant during the on and off states.

10. The LIDAR system of claim 7, wherein the background light is measured during an integration period, wherein the integration period comprises a plurality of cycles, each comprising a gate time when the function changes monotonically, a plateau time, and an off time, wherein the function is constant during the plateau time and the off time, and wherein the background light is measured during one of the plateau time or the off time, and wherein laser source is synchronized with the shutter so that the reflections are not received during the one of the plateau time or the off time during which the background light is measured.

11. The LIDAR system of claim 10, wherein the background light is measured during the third time period, wherein the background light is measured during the shorter time period selected from the plateau time and the off time.

12. The LIDAR system of claim 10, wherein the background light is measured during the second time period in parallel with obtaining the normalization measurement, wherein the background light is measured during the longer time period selected from the plateau time and the off time and the intensity of the reflections for the normalization measurement is measured during the shorter time period selected from the plateau time and the off time.

13. The LIDAR system of claim 6, wherein determining the ranges to the objects in the environment comprises:

removing effects of the background light from the range measurement and the normalization measurement using the background measurement; and normalizing, after removing the effects of the background light, the range measurement using the normalization measurement.

14. A method, comprising:

synchronizing a laser source and a shutter in a LIDAR system such that reflections generated in response to emitted light pulses are received during a first time period when the shutter is in the process of switching between on and off states;

measuring, during the first time period, an intensity of the reflections to obtain a range measurement;

synchronizing the laser source and the shutter such that the reflections are received during a second time period when the shutter is in one of the on or off states;

measuring, during the second time period, an intensity of the reflections to obtain a normalization measurement;

measuring, during at least one of the second time period or a third time period, an intensity of background light to obtain a background measurement; and determining ranges to objects in the environment based on the range measurement, the normalization measurement, and the background measurement.

15. The method of claim 14, wherein, when in the process of switching between the on and off states, a function of the shutter changes monotonically.

16. The method of claim 15, wherein the reflections are received at the shutter at different times such that the function of the shutter changes a characteristic of the reflections depending on when each of the reflections is received at the shutter.

17. The method of claim 15, further comprising:

operating a second LIDAR system in parallel with the LIDAR system by emitting light pulses in a same environment, wherein shutters in the LIDAR system and the second LIDAR system have duty cycles where one state is $1/100^{th}$ or less than a duration of another state.

18. The method of claim 15, wherein the background light is measured during an integration period, wherein the integration period comprises a plurality of cycles, each comprising a gate time when the function changes monotonically, a plateau time, and an off time, wherein the function is constant during the plateau time and the off time, and wherein the background light is measured during one of the plateau time or the off time, and wherein laser source is synchronized with the shutter so that the reflections are not received during the one of the plateau time or the off time during which the background light is measured.

19. The method of claim 18, wherein the background light is measured during the third time period, wherein the background light is measured during the shorter time period selected from the plateau time and the off time.

20. The method of claim 18, wherein the background light is measured during the second time period in parallel with obtaining the normalization measurement, wherein the background light is measured during the longer time period selected from the plateau time and the off time and the intensity of the reflections for the normalization measurement is measured during the shorter time period selected from the plateau time and the off time.

* * * * *